US012485356B2

(12) United States Patent
Lui et al.

(10) Patent No.: US 12,485,356 B2
(45) Date of Patent: Dec. 2, 2025

(54) AUTOMATIC DISINFECTION DEVICE FOR VR SELF-SERVICE MACHINE

(71) Applicant: VR LEO USA, INC., Los Angeles, CA (US)

(72) Inventors: Patty Lui, Los Angeles, CA (US); Xiuchao Chen, Shanghai (CN)

(73) Assignee: VR LEO USA, INC., Los Angeles, CA (US)

( * ) Notice: Subject to any disclaimer, the term of this patent is extended or adjusted under 35 U.S.C. 154(b) by 932 days.

(21) Appl. No.: 17/493,488

(22) Filed: Oct. 4, 2021

(65) Prior Publication Data

US 2022/0023764 A1 Jan. 27, 2022

Related U.S. Application Data

(63) Continuation-in-part of application No. 29/761,263, filed on Dec. 8, 2020, now Pat. No. Des. 1,014,637.
(Continued)

(30) Foreign Application Priority Data

Jan. 16, 2018 (CN) .......................... 201810041883.9
Jul. 6, 2018 (CN) .......................... 201810738220.2
(Continued)

(51) Int. Cl.
*A63F 13/98* (2014.01)
*A61L 2/10* (2006.01)
(Continued)

(52) U.S. Cl.
CPC ................ *A63F 13/98* (2014.09); *A61L 2/10* (2013.01); *A61L 2/18* (2013.01); *A61L 2/20* (2013.01); *A61L 2202/20* (2013.01)

(58) Field of Classification Search
CPC ............. A61L 2202/00; A61L 2202/11; A61L 2202/122; A61L 2202/14; A61L 2202/20; A63F 13/98
See application file for complete search history.

(56) References Cited

U.S. PATENT DOCUMENTS 2,979,576 A 4/1961 Huber
3,705,962 A 12/1972 Banister
(Continued)

FOREIGN PATENT DOCUMENTS

CN 106943609 A * 7/2017
EP 987661 A2 * 3/2000 ............. G07F 17/32
(Continued)

OTHER PUBLICATIONS

International Preliminary Report on Patentability, International Application PCT/US2019/013873 mailed Jul. 30, 2020.
(Continued)

*Primary Examiner* — Steven J Hylinski
(74) *Attorney, Agent, or Firm* — Nolan Heimann LLP; Adam Diament (57) ABSTRACT

Disclosed is an automatic disinfection device for a VR self-service machine, comprises two parts, a head display disinfection device, and a joystick disinfection device. The head display disinfection device comprises a light tube holder or base, a disinfecting light tube or bulb, and a power line. The disinfection light tubes or bulbs are installed on two sides of an inner wall of a VR self-service head display storage device. The joystick disinfection device in one embodiment comprises disinfecting light bulbs installed below the back plate of a VR self-service machine through a back plate attachment, and a protective cover is installed in front of the disinfecting light bulb. In another embodiment the joy sticks removably mounted on the left and right sides
(Continued)

of the VR gaming machine are also exposed to disinfecting UV light.

3 Claims, 7 Drawing Sheets

Related U.S. Application Data and a continuation-in-part of application No. 16/713,546, filed on Dec. 13, 2019, now Pat. No. 11,148,046, and a continuation-in-part of application No. 16/572,940, filed on Sep. 17, 2019, now Pat. No. 11,285,519, and a continuation-in-part of application No. 16/249,831, filed on Jan. 16, 2019, now Pat. No. 11,145,160.

(30) Foreign Application Priority Data

| Sep. 17, 2018 | (CN) | 201821514354.8 |
|---|---|---|
| Dec. 13, 2018 | (CN) | 201822092662.2 |

(51) Int. Cl.
*A61L 2/18* (2006.01)
*A61L 2/20* (2006.01)

(56) References Cited

U.S. PATENT DOCUMENTS

| 3,821,496 | A |  | 6/1974 | Malone |  |
| 4,114,736 | A |  | 9/1978 | Scherenberg |  |
| 4,232,837 | A |  | 11/1980 | Cutler |  |
| 4,384,688 | A |  | 5/1983 | Smith |  |
| 4,509,383 | A |  | 4/1985 | Yeh |  |
| 4,735,377 | A |  | 4/1988 | Zuehsow |  |
| 4,901,938 | A |  | 2/1990 | Cantley et al. |  |
| 5,168,969 | A |  | 12/1992 | Mayhew |  |
| 5,372,225 | A |  | 12/1994 | Joynes et al. |  |
| 5,489,010 | A |  | 2/1996 | Rogers |  |
| 5,874,944 | A |  | 2/1999 | Khoury |  |
| 6,067,077 | A |  | 5/2000 | Martin et al. |  |
| 6,068,257 | A |  | 5/2000 | Orfield |  |
| 6,144,864 | A |  | 11/2000 | Lands et al. |  |
| 6,251,014 | B1 |  | 6/2001 | Stockdale et al. |  |
| 6,422,941 | B1 |  | 7/2002 | Thorner et al. |  |
| 6,458,331 | B1 | * | 10/2002 | Roberts | A61L 2/10 |
|  |  |  |  |  | 422/186.3 |
| 6,459,175 | B1 |  | 10/2002 | Potega |  |
| D474,183 | S |  | 5/2003 | Mesa |  |
| 6,638,166 | B2 |  | 10/2003 | Hedrick et al. |  |
| 6,781,570 | B1 |  | 8/2004 | Arrigo et al. |  |
| 7,309,286 | B2 |  | 12/2007 | Hedrick et al. |  |
| 7,445,551 | B1 |  | 11/2008 | Okada et al. |  |
| 8,165,646 | B2 |  | 4/2012 | Zheng |  |
| 8,203,124 | B2 | * | 6/2012 | Havens | A61L 2/10 |
|  |  |  |  |  | 250/455.11 |
| 10,071,307 | B1 |  | 9/2018 | Castelli |  |
| 10,179,598 | B1 |  | 1/2019 | Goodbinder et al. |  |
| 10,376,605 | B1 | * | 8/2019 | Majdali | A61L 2/26 |
| 2001/0000663 | A1 |  | 5/2001 | Shahoian et al. |  |
| 2001/0010513 | A1 |  | 8/2001 | Rosenberg et al. |  |
| 2001/0026264 | A1 |  | 10/2001 | Rosenberg |  |
| 2003/0150475 | A1 | * | 8/2003 | Abrams | B65B 55/027 |
|  |  |  |  |  | 134/1 |
| 2004/0140617 | A1 |  | 7/2004 | Cordell |  |
| 2008/0067417 | A1 | * | 3/2008 | Lane | A61L 2/24 |
|  |  |  |  |  | 250/455.11 |
| 2008/0174550 | A1 |  | 7/2008 | Laurila et al. |  |
| 2009/0069081 | A1 |  | 3/2009 | Thorner |  |
| 2009/0252646 | A1 | * | 10/2009 | Holden | A61L 2/10 |
|  |  |  |  |  | 422/186.3 |
| 2009/0304553 | A1 | * | 12/2009 | Gordon | A61L 2/10 |
|  |  |  |  |  | 422/186 |
| 2010/0235667 | A1 |  | 9/2010 | Mucignat et al. |  |
| 2011/0254760 | A1 |  | 10/2011 | Lloyd et al. |  |
| 2014/0354214 | A1 | * | 12/2014 | Phelps | H02J 7/0013 |
|  |  |  |  |  | 320/137 |
| 2015/0002278 | A1 |  | 1/2015 | Shah et al. |  |
| 2015/0039517 | A1 |  | 2/2015 | Liberty et al. |  |
| 2015/0190537 | A1 | * | 7/2015 | Kerr | B08B 1/12 |
|  |  |  |  |  | 15/118 |
| 2015/0297768 | A1 | * | 10/2015 | Bettles | A61L 2/10 |
|  |  |  |  |  | 250/455.11 |
| 2016/0026253 | A1 |  | 1/2016 | Bradski et al. |  |
| 2017/0178392 | A1 |  | 6/2017 | Zaccarino et al. |  |
| 2017/0215293 | A1 |  | 7/2017 | Merenda |  |
| 2017/0216099 | A1 |  | 8/2017 | Saladino |  |
| 2018/0059801 | A1 |  | 3/2018 | Acun et al. |  |
| 2018/0093001 | A1 | * | 4/2018 | Georgeson | A61L 2/0047 |
| 2018/0280554 | A1 | * | 10/2018 | Khajavi | A61L 2/10 |
| 2019/0065027 | A1 |  | 2/2019 | Hauenstein et al. |  |

FOREIGN PATENT DOCUMENTS

| JP |  | 2000056850 | A |  | 2/2000 |  |  |
| JP |  | 2017178612 |  |  | 10/2017 |  |  |
| KR |  | 20160109597 | A | * | 3/2015 |  |  |
| WO |  | WO-9953966 | A1 | * | 10/1999 |  | A61L 2/10 |
| WO |  | WO-2008086347 | A1 | * | 7/2008 |  | A47B 25/00 |
| WO |  | WO-2017141767 | A1 | * | 8/2017 |  | A63F 13/25 |

OTHER PUBLICATIONS

Anonymous: "China VR Super Hero Manufacturers and Suppliers—VR Super Hero Factory—Movie Power", Sep. 14, 2017 (Sep. 14, 2017), XP055567363, Retrieved from the Internet: URL:https://web.archive.org/web/20170914223331/http:I/www.vrmoviepower.com/vr-simulator/vr-super-hero/[retrieved on Mar. 11, 2019].

* cited by examiner

AUTOMATIC DISINFECTION DEVICE FOR VR SELF-SERVICE MACHINE

This application is a continuation-in-part of continuation-in-part of U.S. application Ser. No. 16/572,940 filed Sep. 17, 2019, which claims benefit of Chinese Patent Application No. 201821514354.8 filed Sep. 17, 2018, and is a Continuation-in-Part of and claims benefit of U.S. application Ser. No. 29/761,263, filed Dec. 8, 2020. This application is also a Continuation-in-Part of U.S. application Ser. No. 16/249,831 filed Jan. 16, 2019, which claims benefit of Chinese Patent Application No. 201810738220.2 filed Jul. 6, 2018 and Chinese Patent Application No. 201810041883.9 filed Jan. 16, 2018, and is a Continuation-in-Part of U.S. patent application Ser. No. 16/713,546 filed Dec. 13, 2019, which claims benefit of Chinese Patent Application No. 201822092662.2 filed Dec. 13, 2018, said US Patent applications all owned by applicant. The description and figures therein are incorporated herein in their entirety by reference.

TECHNICAL FIELD

The present application relates to a gaming device, more particularly to an integrated virtual reality (VR) gaming machine, capable of being shared or used sequentially by multiple users and operated in an unattended environment. The gaming machine as set forth herein includes automatic disinfection devices mounted therein or thereon capable of disinfecting a VR head device and VR controllers, also referred to as joysticks, and other exterior surfaces of the gaming device that may be touched by users during use of the gaming machine.

BACKGROUND ART

These gaming machines may be installed in and environment having minimal or no service personnel available to assist users or to clean the system between users, referred to as an unattended environment. In such an unattended environment, existing VR self-service machines have operational issues in that the head gear and the one or more manually operated controllers, typically joysticks, are used by many people and thus need to be maintained in a sanitary condition to prevent cross-contamination of the various subsequent users. This is of particular concern due to existence of COVID-19 and the possibility of infections being transmitted among users of the machines. Irrespective of the existence of COVID-19, bacteria and viruses present on the face and hands of users are prone to being transferred from user to user, thereby possibly affecting the user experience. As a result, users may refuse to use the VR game machine and miss the experience of the high-quality game contents because of the fear of unsanitary conditions even if those conditions do not exist. As a result, the cost for providing users with a good VR game experience is increased, which affects the popularity of VR games as well as the promotion of the VR industry because the continued use of service personnel may be needed to maintain a sanitary environment.

SUMMARY

In order to address the above issues, the embodiments disclosed herein provide automatic disinfection solutions for various contact surfaces, particularly the head mounted display unit and the VR controllers and/or joysticks, of a VR self-service machine. These disinfection solutions provide automatic disinfection for the head display and the VR controllers after use by each user without the necessity of service personnel being present to clean and sanitize the game machine between users.

The technical solution adopted by the present embodiments to solve the above technical problems is an automatic disinfection device for a VR self-service machine comprising at least two parts: a head display disinfection device and a controller disinfection device. While the preferred embodiment addressed below comprise disinfecting light sources, particularly UV light sources, one skilled in the art will recognize that the light source can be replaced by or supplemented with other disinfecting agents delivery devices such as heat lamps or other heating sources, disinfectant liquid or gaseous spray delivery systems, drying means such as blowers or a heat source, or a combination of one or more disinfecting or sanitizing sources.

BRIEF DESCRIPTION OF THE DRAWINGS

The present utility model is further described in detail below with reference to the accompanying drawings.

DETAILED DESCRIPTION OF THE EMBODIMENTS

Figure 1:
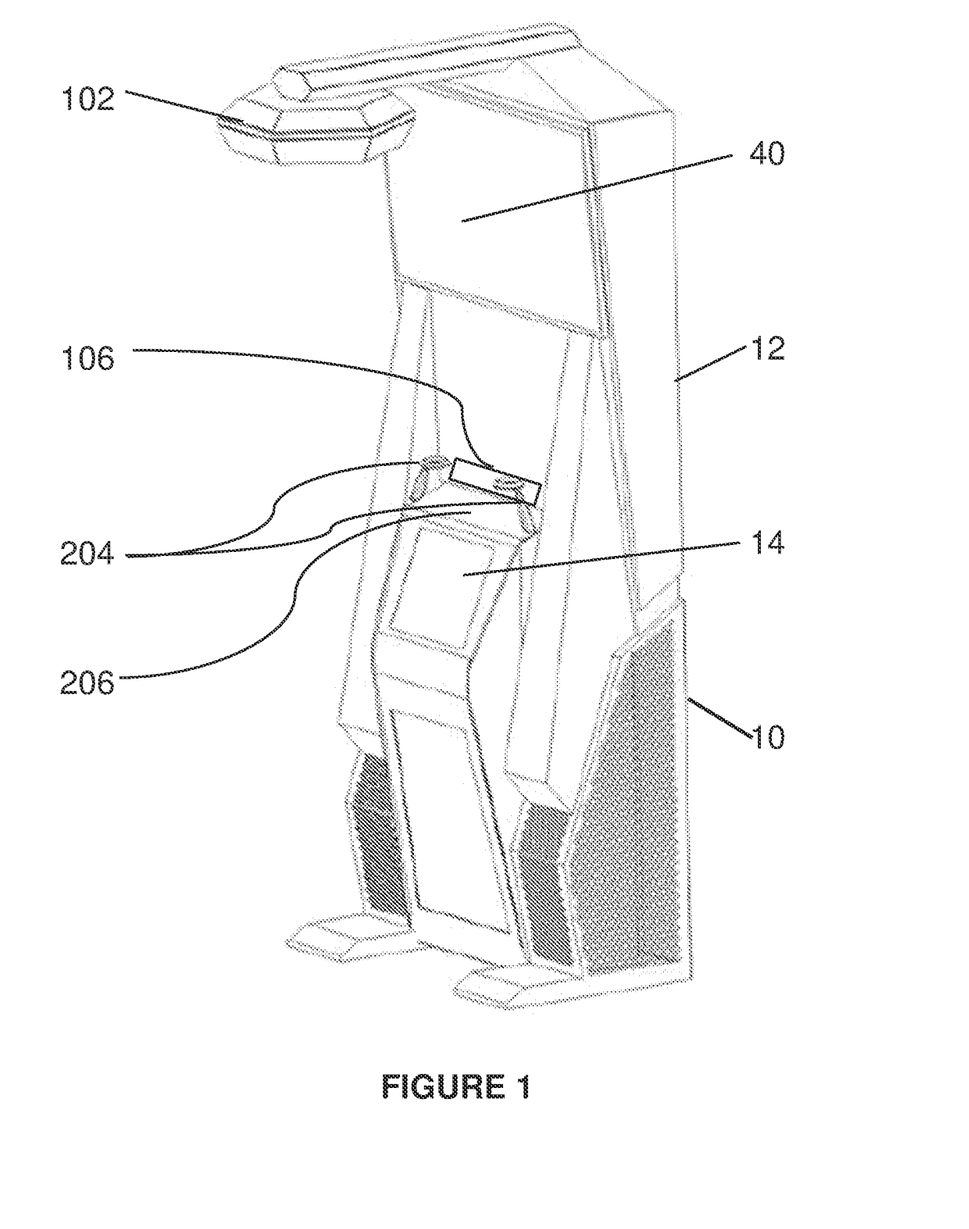
FIG. 1 is a front perspective view of a first embodiment of a gaming machine as shown in U.S. application Ser. No. 16/249,831 published as US 2019/0221073.
Figure 2:
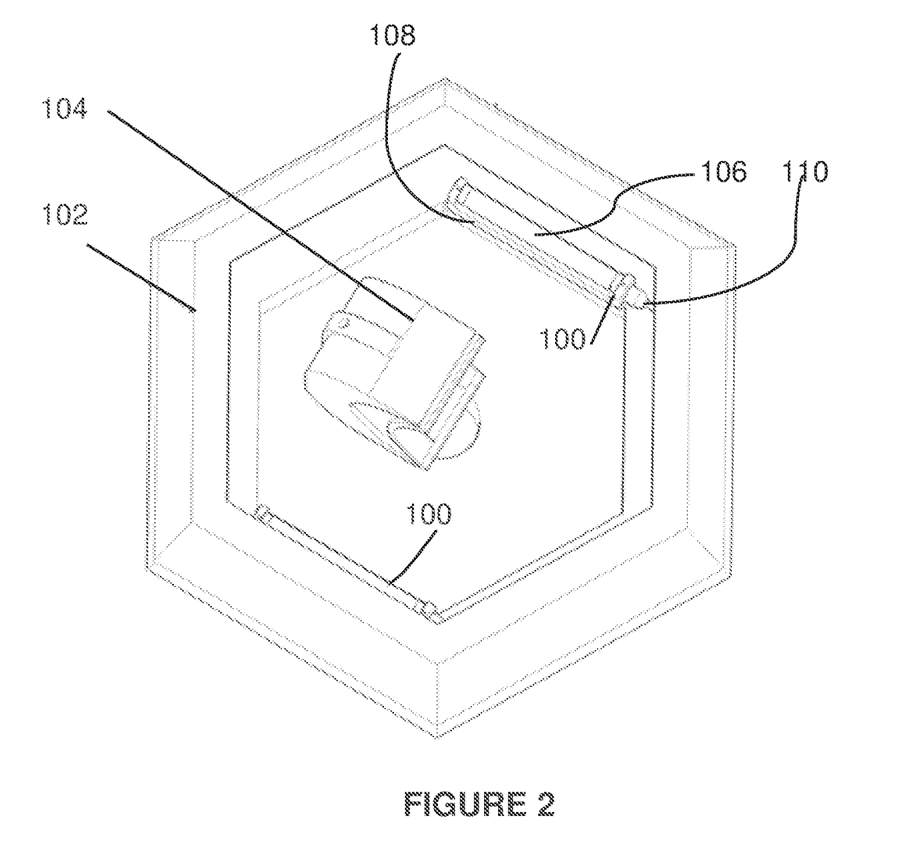
FIG. 2 is a bottom view of an overhead storage compartment of a VR self-service machine such as shown in FIG. 1 showing a head display unit within the compartment and a disinfection device positioned to disinfect the head display unit.
Figure 3:
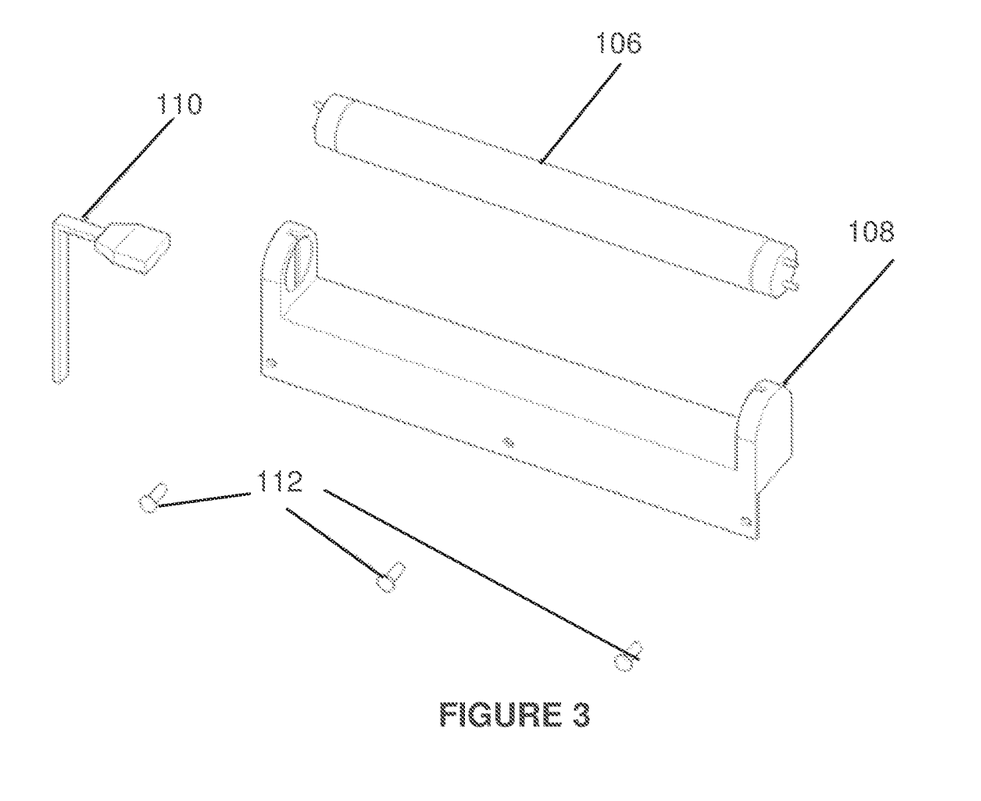
FIG. 3 is an exploded view of the disinfection device structure for the head display installed in the overhead storage compartment of FIG. 1.

FIG. 1 shows a first embodiment of a VR gaming machine 10 incorporating features of the invention. The VR gaming machine 10 has at least one head mounted display unit 104 as shown in FIG. 2 that is retracted into an overhead storage compartment 102, a main display screen 40 and a touch screen display 14. FIG. 2 shows components within the overhead storage compartment 102. As shown in FIG. 3 the disinfection device 100 comprises a disinfecting light tube 106 mounted within the overhead storage compartment 102. In the embodiment shown, the disinfection light tube 106 is mounted in the light tube base 108 and is installed on both sides of an inner wall of a VR self-service head display storage compartment 102.

The disinfection light tube 106 emits ultraviolet irradiation toward the head display 104 to disinfect the head display. This enables automatic disinfection of the head display 104 in an unattended environment.

Figure 4:
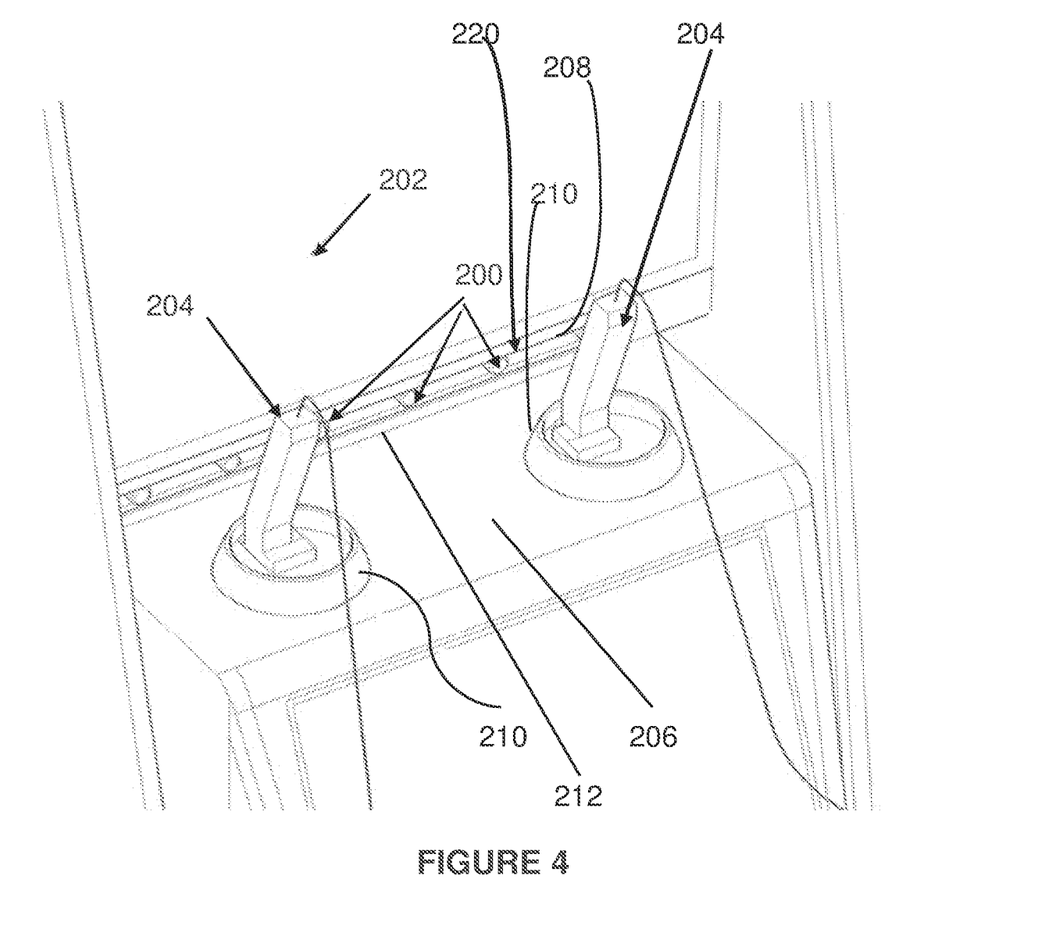
FIG. 4 is a front perspective view showing a pair of joysticks removably mounted on a front panel of a second embodiment of a gaming machine with a joystick disinfection device provided adjacent thereto.

In the embodiment of FIG. 4 a pair of joysticks 204 is shown mounted on a front panel 206 along with a disinfection device comprising a protective cover 208 to prevent the disinfectant UV bulbs 200 therein from damage by external contact, a back plate 202, and a light bulb base 212 with light bulbs 200 which emit UV light of a wavelength suitable for disinfecting surfaces exposed to that light. The disinfecting light bulbs 200 are installed below the back plate 202 of the VR self-service machine 10 and the protective cover 208 is installed in front of the disinfecting light bulbs 200. The joysticks 204 are irradiated by emissions from the UV light bulbs 200, the radiation destroying biological contamination that may be on the surface of the joysticks 204. Switches (not show) cause the UV light bulbs 200 to be activated when the joysticks 204 are not in use and are placed back in the holders 210 on the front panel 206. This enables automatic disinfection of the joystick when they are not in use such as between users.

The beneficial effects of the present embodiments are that the automatic disinfection device for VR self-service machine 10 has the advantages of simple operation, convenient use, the need for manual disinfection between users is reduced or eliminated, and the users can wear the disinfected head display 104 and pick up the disinfected joystick 204 in a safe and hygienic manner. As a result, the VR device can be used in an unattended environment, which makes the operation simpler, more efficient, and lower in cost, thereby greatly reducing the threshold of entry to the VR entertainment industry.

Figure 6:
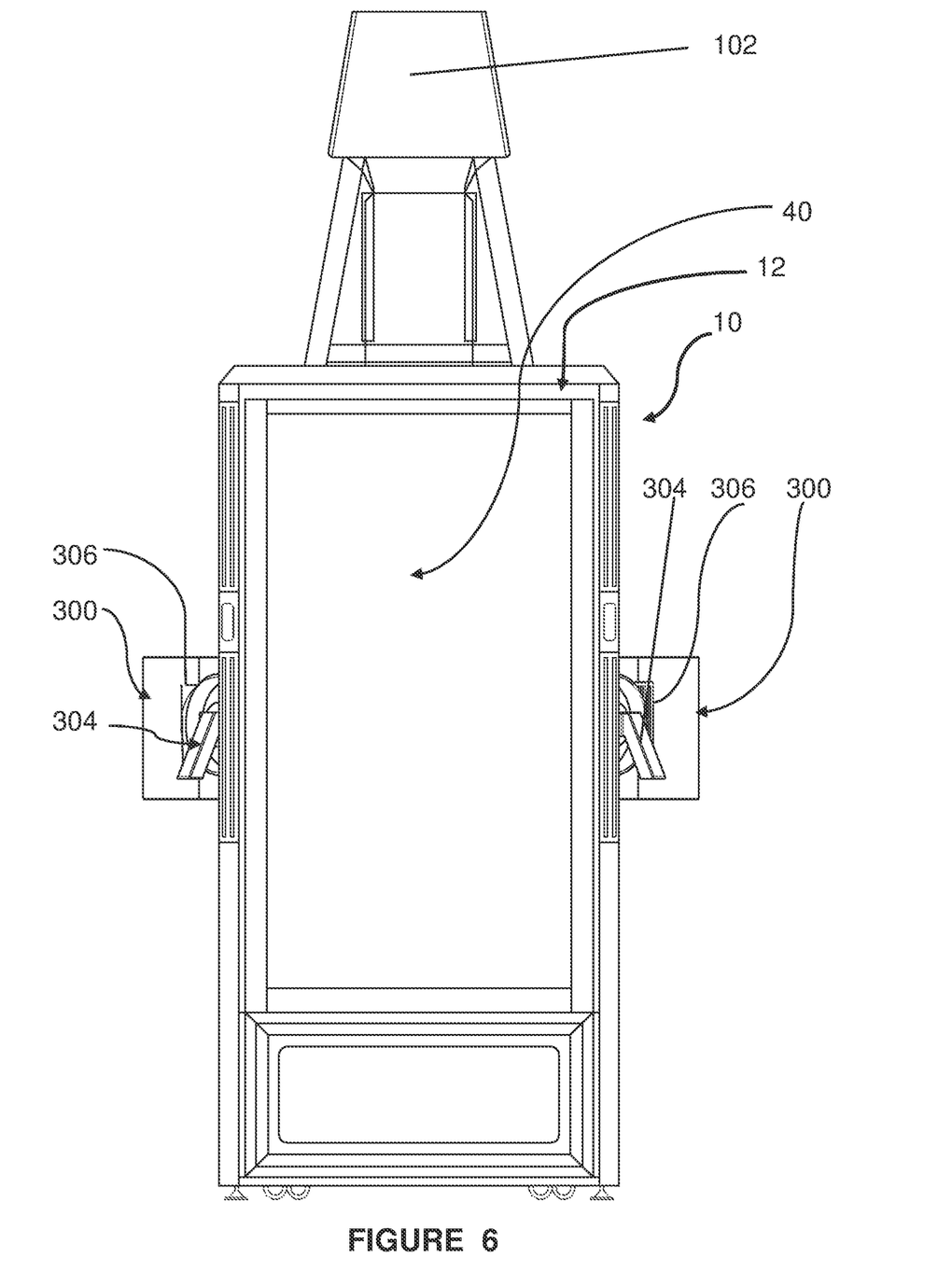
FIG. 6 is a front view of another embodiment of a VR gaming machine incorporating a pair of joysticks removably mounted in storage boxes on the left and right exterior walls of the VR gaming machine.

FIGS. 1 and 6 show the major components of an embodiment of the VR gaming machine 10, which includes a hollow main box or cabinet 12, a head display unit 104 (see FIG. 2) stored in an overhead storage compartment assembly 102, and a main display 40. The head display 104 is raised and lowered by a pully assembly (not shown) which is hidden within an upper portion of the VR gaming machine 10. In the embodiments of FIG. 1 and FIG. 4 the VR handles (joysticks) 204 are mounted on the front panel 206. In FIG. 6 the removable joy sticks 304 are positioned in receiving boxes 300 on the left and right of a gaming machine 10. The structure and components of the head display disinfecting device 100, which are within the overhead storage compartment 102, are described in detail with reference to FIGS. 2 and 3.

As shown in FIG. 2, a pair of head display disinfection devices 100 are respectively installed on two sides of an inner wall of the head display storage compartment 102 by screws, bolts or other attachment means 112 so the head display disinfection devices 100 irradiates the and disinfects the head display 104. As shown in FIG. 3, the head display disinfection device 100 comprises a disinfecting light tube 106 and a light tube holding base 108 that is fixed on both sides of the inner wall of the head display storage device 102.

When the VR self-service gaming machine 10 is in a working state, the head display 104 is lowered from the head display storage compartment 102, and the VR self-service gaming or machine 10 automatically turns off power to a first power line 110 attached to the head display disinfection devices 100. When the VR self-service gaming machine is not in use, the head display 104 is automatically retracted into the head display storage device 102, and the VR self-service gaming machine turns on the power to the first power cord 110 and the head display disinfection devices 100, restarting the disinfection process.

Figure 5:
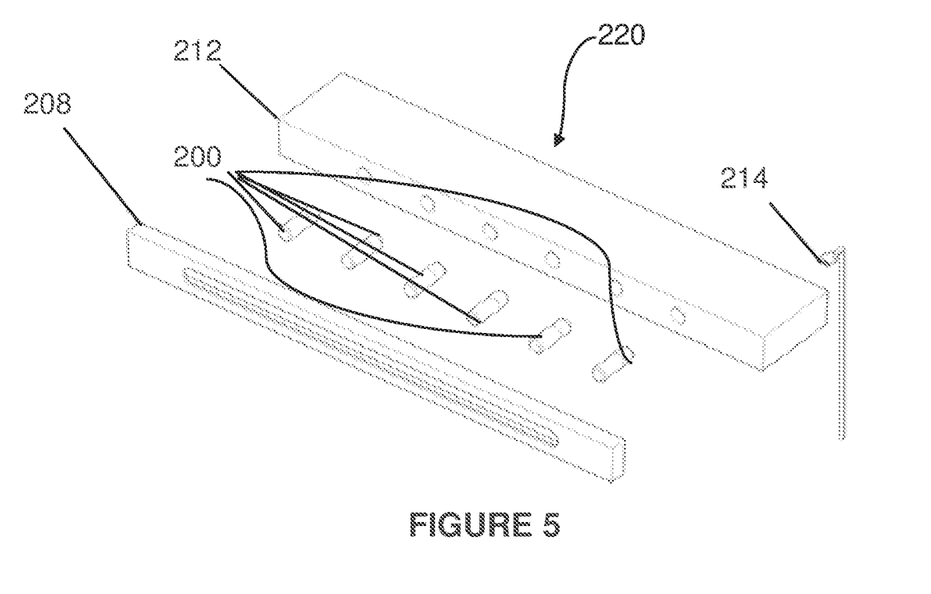
FIG. 5 is an exploded view of the joystick disinfection structure in FIG. 5 incorporating features of the invention.

As shown in FIGS. 4 and 5, one embodiment of a joystick disinfection device 220 comprises a protective cover 208, disinfecting light bulbs 200, a back plate attachment 202, and a second power line 214. The disinfecting light bulbs 200 are installed in openings in a bulb base 212 on the back plate 202, the protective cover 208 is installed in front of the disinfecting bulbs 200, and the VR self-service machine provides power to the joystick disinfection device 220 through the second power line.

When the VR self-service machine host is in a working state, the power supply to the joystick disinfection device 220 is turned off, thus stopping the disinfection process. When the VR self-service machine is not in use, the joystick is placed in joy stick holders 210 of the VR self-service machine 10. After a designated period of time, such as 2-5 minutes, the VR self-service machine 10 supplies power to the joystick disinfection device 220, and the disinfection process begins. When the machine is turned back on, the power to the joystick disinfection device 220, and the disinfection process stops.

Figure 7:
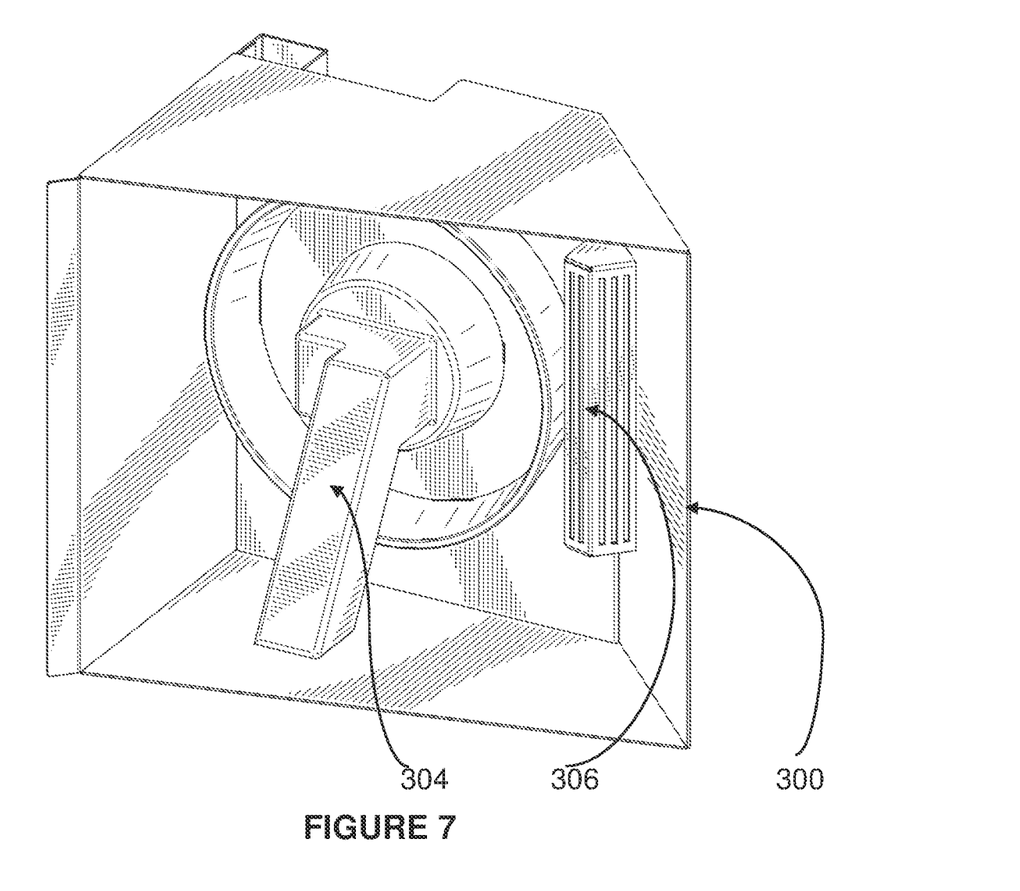
FIG. 7 is an enlarged view of the joystick and storage box mounted on the right wall of the gaming machine of FIG. 6. A similar joystick and storage box, as shown in FIG. 6 is mounted on the left side of the VR gaming machine.

FIG. 6 shows a further embodiment of a VR gaming machine with joysticks 304 resting in receiving boxes 300 on the left and right of the sides of the main box or cabinet 12 of the gaming machine 10. FIG. 7 is an enlarged view of one of the joysticks 304 in the enclosure with the UV disinfecting light 306 to the right rear of the joystick 304. FIG. 6 shows a similar joy stick 304 mounted on the left side of the main box or cabinet 12 with the disinfectant light 306 mount to the left rear of the joystick 304.

As set forth above in regard to FIGS. 4 and 5, when the VR self-service machine is in a working state, the power supply to the joystick disinfection device 306 is turned off, thus stopping the disinfection process. When the VR self-service machine is not in use, the joysticks 304 are placed in the joy stick receiving boxes 300 of the VR self-service machine 10, after a designated period of time, such as 2-5 minutes, the VR self-service machine supplies power to the joystick disinfection device 306, and the disinfection process begins again. When the machine is turned back on, the power to the joystick disinfection device 306, and the disinfection process stops.

While the VR gaming machine embodiments shown and described herein are configured for operation by a single user, the improvements described herein can also be included in VR gaming machines configured for simultaneous use by two or more users so as to provide a competitive gaming experience and can include multiple head displays and multiple pairs of controllers/joysticks.

Various modifications and changes can be made to the present utility model by a person skilled in the art. Therefore, the present embodiment covers various modifications and changes that come within the scope of the appended claims or equivalents thereof.

We claim:

1. A virtual reality (VR) self-service gaming machine, comprising:
   one or more manually operated controllers for operating the VR self-service gaming machine, wherein the one or more VR controllers are operatively connected to a control portion of the VR self-service gaming machine;
   a first storage compartment located at a top portion of the VR self-service gaming machine, wherein the first storage compartment extends perpendicularly from the VR self-service gaming machine, wherein the first storage compartment is configured to store a head mounted display device, wherein the head mounted display device is worn by a user of the VR self-service gaming machine for observing a VR output, and wherein the head mounted display device is retractable into the first storage compartment;

a plurality of second storage compartments located on or in a left and a right side of the VR self-service gaming machine for receiving the one or more manually operated controllers; and one or more disinfection devices integrated into the first storage compartment and each of the second storage compartments, wherein each disinfection device is positioned to deliver a disinfectant agent comprising ultraviolet light to the head mounted display device and the one or more manually operated controllers when placed in their respective compartments, and wherein the disinfection devices are configured to automatically activate when the head mounted display device of the one or more manually operated controllers are detected to be in their respective compartments.

2. The VR self-service gaming machine of claim 1, wherein the one or more manually operated controllers for operating the VR self-service gaming machine are joysticks.

3. A virtual reality (VR) self-service gaming machine, comprising:

one or more manually operated controllers for operating the VR self-service gaming machine and at least one head mounted display device configured for placement on a user's head for observing a VR output, wherein the one or more manually operated controllers are operatively connected to a control portion of the VR self-service gaming machine;

controller storage compartments located on or in a left side and a right side of the VR self-service gaming machine or a front mounted console thereof, each configured to receive one of the manually operated controllers;

a head display storage compartment located at the top of the VR self-service gaming machine, configured to receive the head mounted display device, wherein the head display storage compartment extends perpendicularly from the VR self-service gaming machine, and wherein the head mounted display device is retractable into the head display storage compartment; and one or more disinfection devices positioned adjacent the controller storage compartments and the head display storage compartment, wherein the one or more disinfection devices are configured to deliver ultraviolet light to disinfect contact surfaces of the one or more manually operated controllers and the at least one head mounted display device, and wherein each disinfection device is configured to automatically operate when its corresponding controller or head display is placed in its storage compartment.

* * * * *